(12) United States Patent
Kim et al.

(10) Patent No.: US 7,821,976 B2
(45) Date of Patent: Oct. 26, 2010

(54) APPARATUS AND METHOD FOR CONTROLLING TRANSMISSION POWER IN A WIRELESS COMMUNICATION SYSTEM

(75) Inventors: Young-Soo Kim, Seoul (KR); Sung-Hyun Choi, Seoul (KR); Kyung-Hun Jang, Suwon-si (KR); Hyo-Sun Hwang, Suwon-si (KR)

(73) Assignees: Samsung Electronics Co., Ltd., Suwon-si (KR); Seoul National University Industry Foundation, Seoul (KR)

( * ) Notice: Subject to any disclaimer, the term of this patent is extended or adjusted under 35 U.S.C. 154(b) by 884 days.

(21) Appl. No.: 10/974,309

(22) Filed: Oct. 27, 2004

(65) Prior Publication Data

US 2005/0147125 A1    Jul. 7, 2005

(30) Foreign Application Priority Data

Oct. 27, 2003    (KR) ...................... 10-2003-0075195

(51) Int. Cl.
  G08C 17/00    (2006.01)
(52) U.S. Cl. .................... 370/311; 370/230; 370/318
(58) Field of Classification Search ................. 370/230, 370/311, 312, 318, 471, 474
  See application file for complete search history.

(56) References Cited

U.S. PATENT DOCUMENTS 5,636,140 A * 6/1997 Lee et al. .................... 370/469
6,463,073 B1 * 10/2002 Bontu et al. ................. 370/442
2004/0038695 A1 * 2/2004 Sharony et al. ............. 455/517
2004/0111663 A1 * 6/2004 Lewis ......................... 714/776
2005/0083867 A1 * 4/2005 Dombrowski ............... 370/311
2007/0060132 A1 * 3/2007 Wilhelmsson et al. ....... 455/445

OTHER PUBLICATIONS

Jung, Eun-Sun, et al., "A Power Control MAC Protocol for Ad Hoc Networks," Proceedings of the 8th Annual International Conference on Mobile Computing and Networking Mobicom, Sep. 23, 2002, pp. 36-47.
Ae-Ri Lim, et al., "Hierarchical Access Scheme Based on Adjustable Maximum Transmission Power Level in Wireless Ad Hoc Networks," Vehicular Technology Conference, 2003, pp. 2814-2818.
Agarwal, Sharad, et al., "Distributed Power Control in Ad-hoc Wireless Networks," IEEE International Symposium on Personal, Indoor and Mobileradio Communications, vol. 2., Sep. 2001, pp. F59-F66.

* cited by examiner

Primary Examiner—Kwang B Yao
Assistant Examiner—Nguyen Ngo
(74) Attorney, Agent, or Firm—NSIP Law

(57) ABSTRACT

A method and system for controlling the transmission power of a terminal transmitting frames in a wireless communication system, the frames having a frame structure including a header field containing information related to a transmission rate and length of data transmitted in a frame and a data field having the data. The transmitting terminal transmits the header field to a receiving terminal at a maximum transmit power level available to the transmitting terminal so that second terminals other than the transmitting terminal and the receiving terminal within the wireless communication system can identify that resources are in use. The transmitting terminal transmits the data field at an optimum transmit power level great enough to allow the data field to reach the receiving terminal.

18 Claims, 8 Drawing Sheets

APPARATUS AND METHOD FOR CONTROLLING TRANSMISSION POWER IN A WIRELESS COMMUNICATION SYSTEM

PRIORITY

This application claims priority under 35 U.S.C. §119 to an application entitled "Apparatus and Method for Controlling Transmit Power in a Wireless Communication System" filed in the Korean Intellectual Property Office on Oct. 27, 2003 and assigned Serial No. 2003-75195, the contents of which are incorporated herein by reference.

BACKGROUND OF THE INVENTION

1. Field of the Invention

The present invention relates generally to a wireless communication system, and in particular, to an apparatus and method for controlling transmission power, which minimizes power consumption in a terminal.

2. Description of the Related Art

A major wireless communication system, WLAN (Wireless Local Access Network) provides services as available in an existing wired LAN system using a wireless medium as a data transmission medium. The WLAN system can transmit and receive data using minimum circuit connections by utilizing RF (Radio Frequency) technology. Diverse WLAN systems are being developed for ultra high-speed communication services. A major WLAN system is based on the IEEE (Institute of electrical and Electronics Engineers) 802.11a standard. It is to be appreciated that the following description is made in the context of an IEEE 802.11a WLAN communication system.

With reference to FIG. 1, the IEEE 802.11a WLAN communication system will be described.

FIG. 1 is a diagram illustrating the IEEE 802.11a WLAN communication system. Referring to FIG. 1, the IEEE 802.11a WLAN communication system comprises an access point (AP) 110 that services a basic service set (BSS) 100 and a plurality of terminals 120, 130, 140 and 150. The terminals 120, 130, 140 and 150 communicate through the AP 110 in a CSMA/CA (Carrier Sense Multiple Access with Collision Avoidance) manner. The CSMA/CA is a transmission technique that allows a plurality of terminals to share the same resources, that is, the same carrier, by utilizing a multiple access technique to avoid collision. If the carrier is busy, the terminals 120, 130, 140 and 150 and the AP 110 attempt to transmit data after a random backoff time, thereby preventing collision.

The random backoff time is a length of time to wait until an opportunity to transmit data is obtained. When the carrier is busy, the terminals 120, 130, 140 and 150 and the AP 110 wait for the random backoff time and then attempt to transmit data.

The structure of the IEEE 802.11a WLAN communication system has been described above in connection with FIG. 1. Now, a description will be made of transmit power of the IEEE 802.11a WLAN communication system with reference to FIG. 2.

FIG. 2 is a diagram illustrating signal coverage areas corresponding to the transmission power in the IEEE 802.11a WLAN communication system.

Referring to FIG. 2, the signal coverage area corresponding to the transmission power of the AP 110 is the area of the BSS 100 as marked with a dotted line. The signal coverage area 200 available by the transmission power of the terminal 120 is marked with a solid line. Because a signal from the terminal 120 reaches the other terminals 130, 140 and 150 within the BSS 100, the terminals 130, 140 and 150 normally detect the signal from the terminal 120, thereby avoiding collision. Although the terminals transmission signals with optimum transmit power, thus avoiding collision, an increase in the transmission power increases power consumption in the terminals in the IEEE 802.11a WLAN communication system.

The recent increase of user demand for the IEEE 802.11a WLAN communication system has driven studies on the increase of data rate in the IEEE 802.11a WLAN communication environment. Reduction of power consumption in the terminals through control of transmission power or receiver power is considered as important as increasing the data rate. It is because most terminals such as PDAs (Personal Digital Assistants) other than APs work with batteries and thus power consumption reduction is an important factor that increases the use time of the terminals.

Transmission power control will now be described below.

First, the transmission power itself is reduced, which is described with reference to FIG. 3.

FIG. 3 is a diagram illustrating a power control mechanism based on the transmission power reduction in the IEEE 802.11a WLAN communication system.

Referring to FIG. 3, the transmission power of the AP 110 allows a signal from the AP 110 to cover the BSS 100, as described in connection with FIG. 2. In view of a power control based on transmission power reduction, the signal coverage area of the terminal 120 in correspondence with its transmission power is an area 300 marked with a solid line. The signal coverage area 200 of the terminal 120 illustrated in FIG. 2 is scaled down to the area 300 because the transmission power of the terminal 120 is reduced.

The signal from the terminal 120 only reaches the terminal 140 within the BSS 100. The other terminals 130 and 150 cannot hear the terminal 120, and would thus fail to detect the use of the carrier. As a result, the terminals 130 and 150 may transmit data, causing collision. Terminals that cannot detect signal transmissions from other terminals are called hidden terminals. Since a hidden terminal does not detect the use of the carrier, the terminal attempts a signal transmission while the carrier is busy for another terminal. The resulting collision leads to a signal retransmission. Eventually, power consumption is increased.

Another transmission power control method using RTS/CTS (Ready-To-Send/Clear-To-Send) will be described with reference to FIG. 4.

FIG. 4 is a diagram illustrating an RTS/CTS-based transmission power control mechanism in the IEEE 802.11a WLAN communication system.

The RTS/CTS was proposed to solve the hidden terminal problem encountered with the transmission power reduction-based power control. With the use of the RTS/CTS, although the transmission power of a terminal is reduced, there exist no hidden terminals. Thus, power consumption in the terminal can be reduced. Referring to FIG. 4, the signal coverage area of the AP 110 in correspondence with its transmission power is the area of the BSS 100. Because the transmission power of the terminal 120 is reduced, its signal coverage area 300 is smaller than before the transmission power reduction.

The signal from the terminal 120 only reaches the terminal 140 within the BSS 100. The other terminals 130 and 150 cannot hear the terminal 120, and will fail to detect the use of the carrier. As a result, the terminals 130 and 150 may transmit data, causing collision. That is, the terminals 130 and 150 act as hidden terminals. The use of the RTS/CTS prevents the terminals 130 and 150 from acting as hidden terminals.

While the signal coverage area 300 of the terminal 120 becomes less due to the power reduction, the terminals 130 and 150 are allowed to hear the terminal 120 through the RTS/CTS. When the terminal 120 intends to transmission a signal to the AP 110, it transmits an RTS frame at a maximum transmit power level before transmitting the signal. The RTS frame covers an area 400 in correspondence with the maximum transmission power of the terminal 120.

The AP 110 then transmits a CTS frame as an acknowledgement (ACK) in response for the RTS frame to the terminal 120 at a maximum transmission power level. The CTS frame covers the area 100 in correspondence with the maximum transmission power of the AP 110. Both the RTS and CTS frames contain information related to an action time for the terminal 120 to transmit a frame and time information about the ACK from the AP 110. Therefore, the other terminals 130, 140 and 150 do not transmit signals for the time set in the RTS and CTS frames, thereby avoiding collision. After transmitting the RTS frame and receiving the CTS frame, the terminal 120 transmits the actual signal at a decreased power level.

Despite its ability of preventing the appearance of hidden terminals and avoiding collision albeit allowing power reduction, the RTS/CTS has the distinctive shortcomings of power consumption and time delay due to the transmission and reception of the RTS and CTS frames. Moreover, a carrier is occupied for the transmission and reception of the RTS and CTS frames, thereby decreasing the total throughput of the IEEE 802.11a WLAN communication system.

SUMMARY OF THE INVENTION

An object of the present invention is to substantially solve the deficiencies, problems and/or disadvantages in the prior art and to provide at least the advantages below. Accordingly, an object of the present invention is to provide an apparatus and method for controlling the transmission power, to minimize power consumption in a terminal in a wireless communication system.

Another object of the present invention is to provide an apparatus and method for controlling the transmission power, to minimize the use of resources in a wireless communication system.

A further object of the present invention is to provide an apparatus and method for controlling the transmission power, to minimize collisions in a wireless communication system.

The above objects are achieved by providing a method and system for controlling the transmission power of a transmitting terminal in a wireless communication system.

According to one aspect of the present invention in a system for controlling the transmission power of a terminal transmitting frames in a wireless communication system, the frames having a frame structure which includes a header field containing information related to a transmission rate and length of data transmitted in a frame and a data field having the data, the transmitting terminal transmits the header field to a receiving terminal at a maximum transmit power level available to the transmitting terminal so that, second terminals other than the transmitting terminal and the receiving terminal within the wireless communication system can recognize that resources are in use, and transmits the data field at an optimum transmit power level great enough to allow the data field to reach the receiving terminal. The receiving terminal receives the frame, determines the transmission duration of the data using the transmission rate and length information included in the header field of the frame, and discontinues transmission of a new frame during the determined data transmission duration.

According to another aspect of the present invention, in a system for controlling the transmission power of a terminal transmitting frames in a wireless communication system the frames having a PLCP PDU frame structure which includes a PLCP preamble field indicating the start of the PLCP PDU frame, a PLCP header field containing information related to a transmission rate and length of data transmitted in the PLCP PDU frame and a data field having the data, the transmitting terminal determines if resources are in use at a time when that the PLCP PDU frame is to be transmitted, transmits the PLCP preamble and header fields to a receiving terminal at a maximum transmit power level available to the transmitting terminal, if the resources are not in use, and transmits the data field at an optimum transmit power level great enough to allow the data field to reach the receiving terminal. The receiving terminal receives the PLCP PDU frame, determines the transmission duration of the data using the transmission rate and length information included in the PLCP header field of the PLCP frame, and discontinues transmission of a new frame during the determined data transmission duration.

According to a further aspect of the present invention, in a method of controlling the transmission power of a terminal transmitting frames in a wireless communication system, the frames having a frame structure which includes a header field containing information related to a transmission rate and length of data transmitted in a frame and a data field having the data, the transmitting terminal transmits the header field to a receiving terminal at a maximum transmit power level available to the transmitting terminal so that second terminals other than the transmitting terminal and the receiving terminal within the wireless communication system can recognize that resources are in use. Then, the transmitting terminal transmits the data field at an optimum transmit power level great enough to allow the data field to reach the receiving terminal.

According to still another aspect of the present invention, in a method of controlling the transmission power of a terminal transmitting frames in a wireless communication system, the frames having a frame structure which includes a header field containing information related to a transmission rate and length of data transmitted in a frame and a data field having the data, the transmitting terminal determines if resources are in use at a time when the frame is to be transmitted, transmits the header field to a receiving terminal at a maximum transmit power level available to the transmitting terminal, if the resources are not in use, and transmits the data field at an optimum transmit power level great enough to allow the data field to reach the receiving terminal.

According to yet another aspect of the present invention, in a method of controlling the transmission power of a terminal transmitting frames in a wireless communication system, the frames having a PLCP PDU frame structure which includes a PLCP preamble field indicating the start of the PLCP PDU frame, a PLCP header field containing information related to a transmission rate and length of data transmitted in the PLCP PDU frame and a data field having the data, the transmitting terminal transmits the PLCP preamble and header fields to a receiving terminal at a maximum transmit power level available to the transmitting terminal so that terminals other than the transmitting terminal and the receiving terminal within the wireless communication system can recognize that resources are in use. The transmitting terminal transmits the data field at an optimum transmit power level great enough to allow the data field to reach the receiving terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method of minimizing the transmission power consumption of a terminal in a wireless communication system, especially in a WLAN. The present invention also provides a method of minimizing the transmission power of the terminal without using additional resources and creating a transmission delay by supporting the interworking between a MAC layer and a PHY layer in the WLAN communication system. The following description is made in the context of the WLAN model based on the IEEE 802.11a standard, by way of example.

Figure 1:
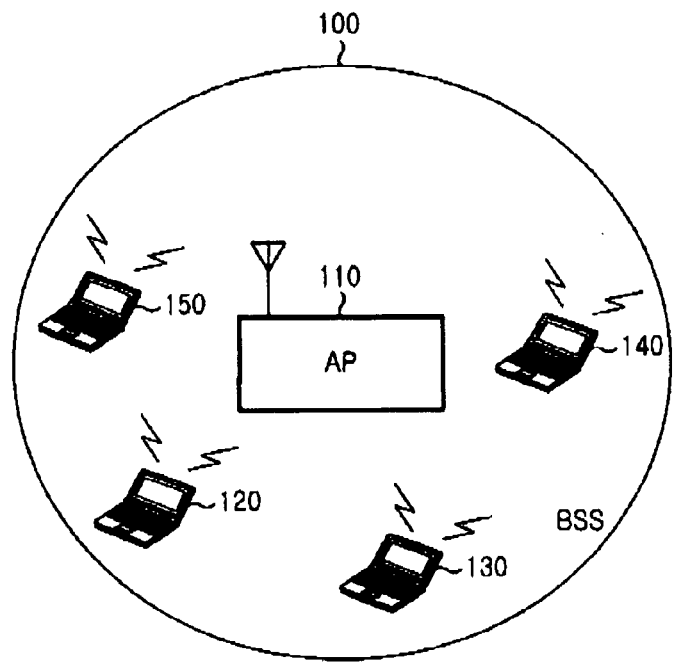
FIG. 1 is a diagram illustrating an IEEE 802.11a WLAN communication system.
Figure 2:
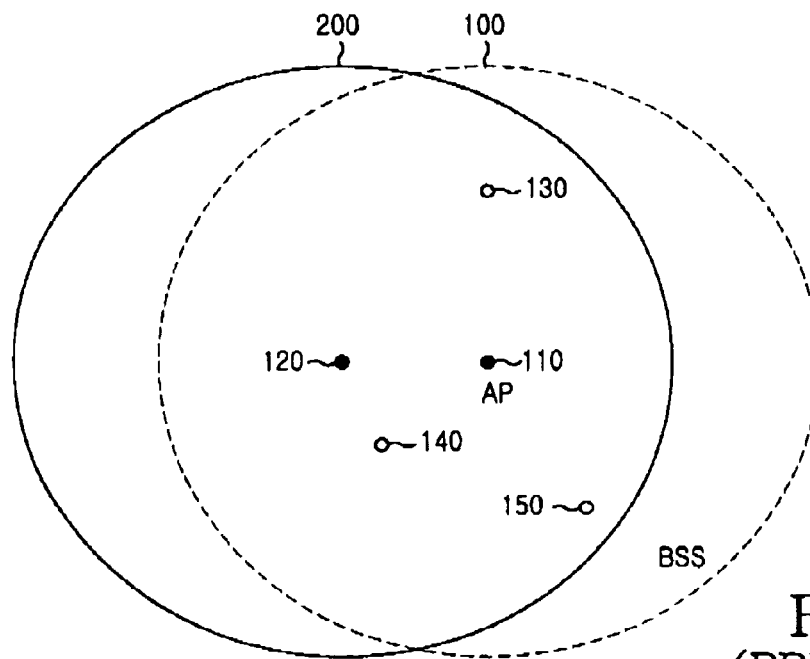
FIG. 2 is a diagram illustrating signal coverage areas corresponding to transmission power in the IEEE 802.11a WLAN communication system.
Figure 3:
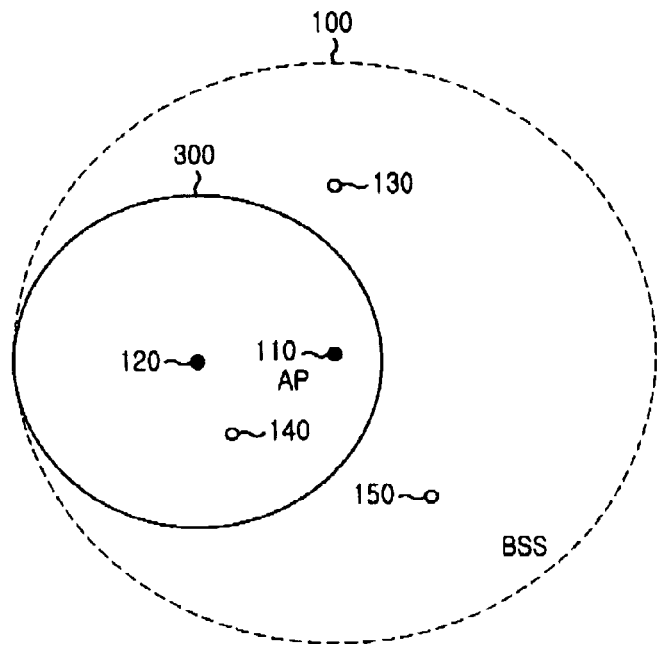
FIG. 3 is a diagram illustrating a transmission power control mechanism based on power reduction in the IEEE 802.11a WLAN communication system.
Figure 4:
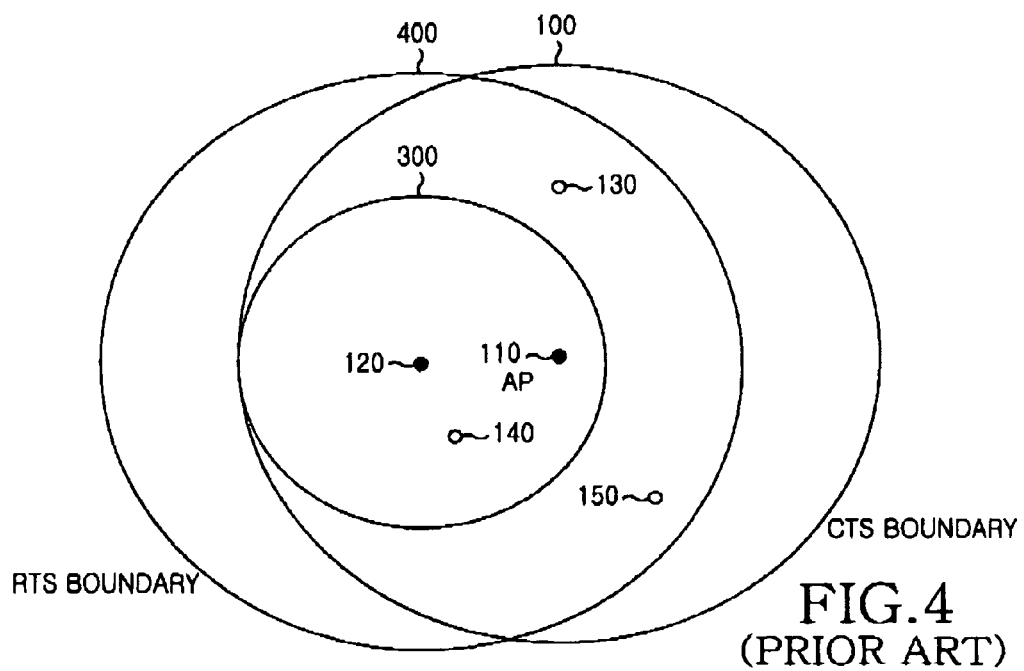
FIG. 4 is a diagram illustrating an RTS/CTS-based transmit power control mechanism in the IEEE 802.11a WLAN communication system.
Figure 5:
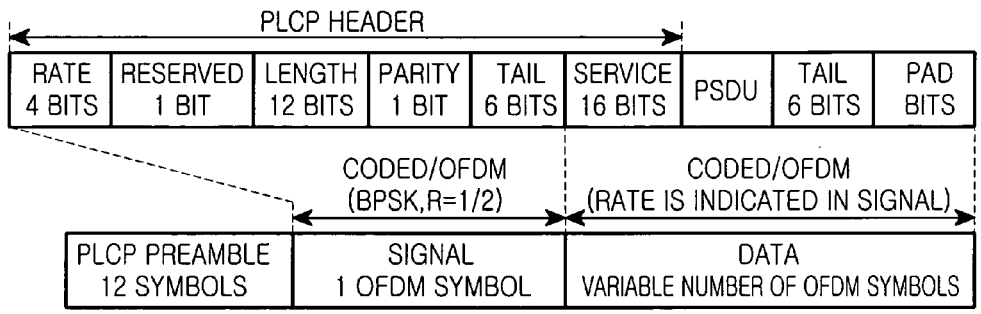
FIG. 5 is a diagram illustrating the format of a PLCP (Physical Layer Convergence Protocol) PDU (Protocol Data Unit) frame in the IEEE 802.11a WLAN communication system.

With reference to FIG. 5, the format of a PLCP PDU (or PPDU) for the IEEE 802.11a WLAN communication system will be described.

FIG. 5 is a diagram illustrating the format of a PLCP PDU frame in the IEEE 802.11a WLAN communication system.

Referring to FIG. 5, the PLCP PDU frame comprises a PLCP PREAMBLE, a PLCP HEADER, and a DATA. The PLCP PREAMBLE indicates the start of the PLCP PDU frame, for use in acquiring synchronization between the PHY layer and the MAC layer. Since the IEEE 802.11a WLAN communication system operates in OFDM (Orthogonal Frequency Division Multiplexing), the PLCP PREAMBLE has a duration of 12 symbols. Here, a symbol is an element of an OFDM symbol. That is, a plurality of symbols form one OFDM symbol.

The PLCP HEADER includes RATE, RESERVED, LENGTH, PARITY, TAIL, and SERVICE fields. The RATE field provides information related to the rate of data transmitted in the DATA field. The LENGTH field indicates the length of the data transmitted in the DATA field.

The PHY layer determines the total transmission time of the frame using the rate and length of the data set in the RATE and LENGTH fields, estimates a current channel state from the transmission information, and notifies the MAC layer of the estimated current channel state. The PARITY field contains a parity bit for data transmitted in the PLCP HEADER, and the TAIL field contains tail bits for the data transmitted in the PLCP HEADER. The SERVICE field provides information for synchronization with a receiving terminal.

The DATA includes PLCP SDU (Service Data Unit) or PSDU, TAIL, and PAD fields. The PSDU field has actual data of the MAC layer. The TAIL field and the PAD field contain tail bits and pad bits, respectively for data transmitted in the DATA.

As described above, once the PHY layer receives transmission information from the RATE and LENGTH fields of the PLCP HEADER, it can determine the transmission time of data. Thus, the PHY layer can determine the use state of resources, that is, a carrier.

Figure 6:
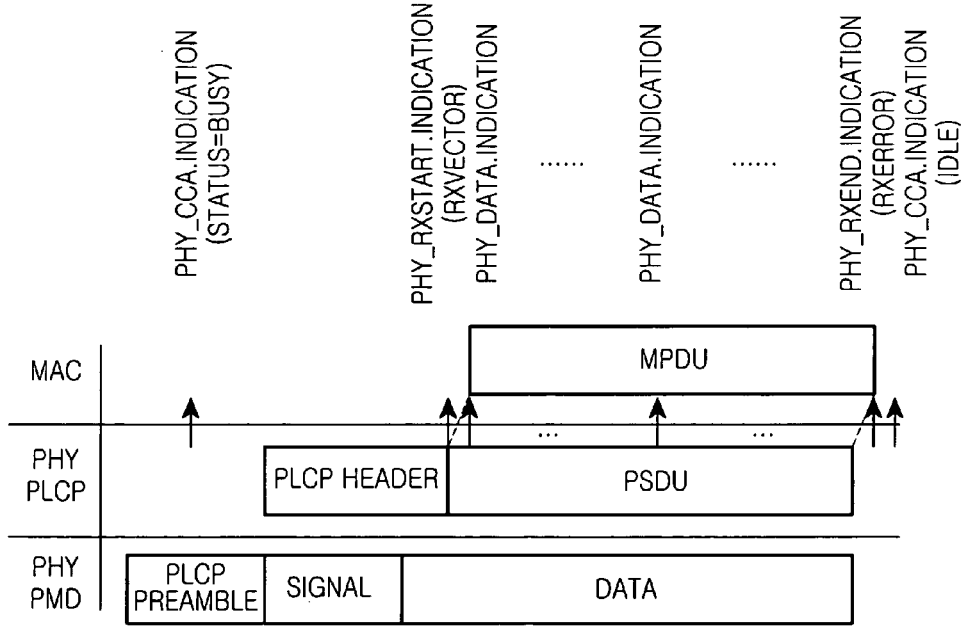
FIG. 6 is a diagram illustrating reception of a PLCP PDU frame having no errors in a MAC (Medium Access Control) layer and a physical (PHY) layer in the IEEE 802.11a WLAN communication system.

The PLCP PDU frame format for the IEEE 802.11a WLAN communication system has been described in connection with FIG. 5. With reference to FIG. 6, the reception of a PLCP PDU frame having no errors in the MAC and PHY layers in the IEEE 802.11a WLAN communication system will be described.

FIG. 6 is a diagram illustrating the reception of a PLCP PDU frame having no errors in both the MAC layer and the PHY layer in the IEEE 802.11a WLAN communication system.

The PHY layer and the MAC layer are defined in the IEEE 802.11a WLAN communication system. The PHY layer is divided into a PLCP sub-layer (hereinafter, referred to as a PHY PLCP layer) and a physical medium dependent (PMD) sub-layer (hereinafter, referred to as PHY PMD layer).

Referring to FIG. 6, upon receipt of a PLCP PDU frame, the PHY PMD layer of a terminal transmits the PLCP PDU frame to the PHY PLCP layer. The PHY PLCP layer analyzes the PLCP PREAMBLE of the PLCP PDU frame. When detecting a PLCP PREAMBLE value, the PHY PLCP layer transmits a PHY_CCA (Clear Channel Assessment).INDICATION (STATUS=BUSY) primitive to the MAC layer. The PHY_CCA.INDICATION primitive indicates the use state of a carrier in the IEEE 802.11a WLAN communication system. "STATUS=BUSY" in the PHY_CCA.INDICATION primitive implies that the carrier is in use. "STATUS=IDLE" implies that the carrier is unused, that is, in an idle state. Reception of the PLCP PDU frame is equivalent to the carrier being used. Thus, STATUS=BUSY is contained in the PHY_CCA.INDICATION primitive. Thus, the MAC layer determines that the carrier is occupied.

If the PLCP HEADER of the PLCP PDU frame is normally demodulated, the PHY PLCP layer transmits a PHY_RXSTART.INDICATION(RXVECTOR) primitive to the MAC layer. The PHY_RXSTART.INDICATION(RXVECTOR) primitive indicates that data reception will start soon. The MAC layer, upon receipt of the PHY_RXSTART.INDICATION(RXVECTOR) primitive, recognizes that data reception will start soon, and awaits the data reception.

As the PSDU of the PLCP PDU frame is demodulated, the PHY PLCP layer transmits the PSDU to the MAC layer by a PHY_DATA.INDICATION primitive. When the PSDU demodulation is normally completed, the PHY PLCP layer transmits a PHY_RXEND.INDICATION(RXERROR) primitive and a PHY_CCA.INDICATION(STATUS=IDLE) to the MAC layer. The PHY_RXEND.INDICATION (RXERROR=NOERROR) primitive indicates normal termination of the data reception, and the PHY_CCA.INDICATION(STATUS=IDLE) primitive indicates that the carrier is in an idle state. The MAC layer recognizes that the carrier is not in use from both the PHY_RXEND.INDICATION (RXERROR=NOERROR) primitive and the PHY_CCA.INDICATION(STATUS=IDLE) primitive.

Reception of a PLCP PDU frame having no errors in the MAC and PHY layers in the IEEE 802.11a WLAN communication system has been described with reference to FIG. 6. Reception of a PLCP PDU frame having errors in the MAC and PHY layers in the IEEE 802.11a WLAN communication system will be described with reference to FIG. 7.

Figure 7:
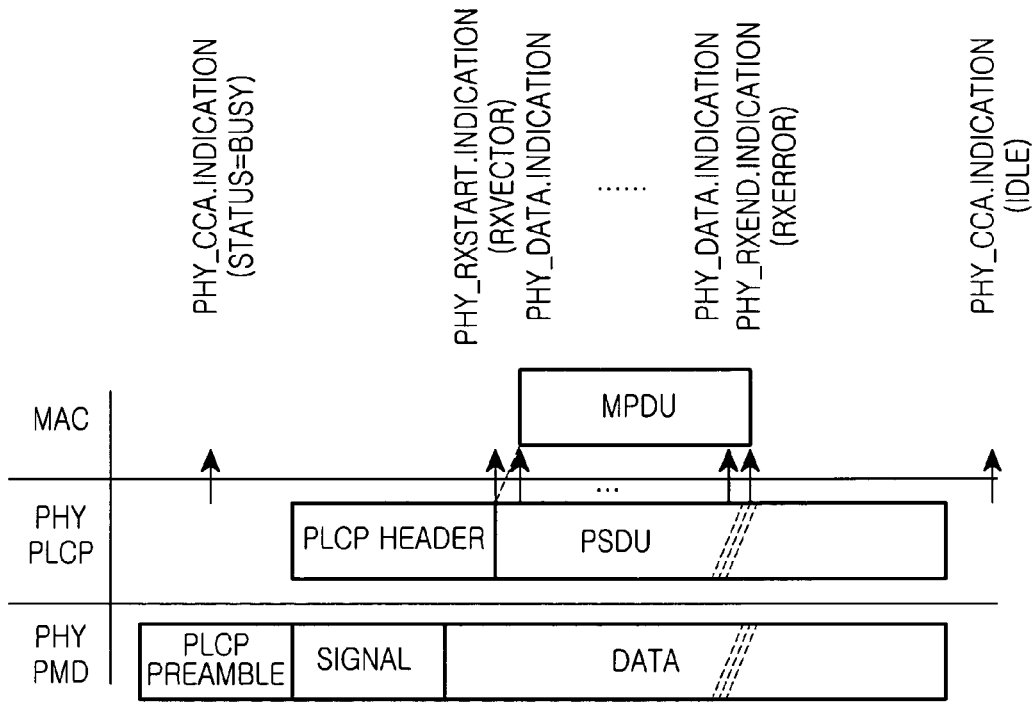
FIG. 7 is a diagram illustrating reception of a PLCP PDU frame having errors in the MAC layer and the physical layer in the IEEE 802.11a WLAN communication system.

FIG. 7 is a diagram illustrating the reception of a PLCP PDU frame having errors in both the MAC layer and the PHY layer in the IEEE 802.11a WLAN communication system.

Referring to FIG. 7, upon receipt of a PLCP PDU frame, the PHY PMD layer of the terminal transmits the PLCP PDU frame to the PHY PLCP layer. The PHY PLCP layer analyzes the PLCP PREAMBLE of the PLCP PDU frame. When detecting a PLCP PREAMBLE value, the PHY PLCP layer transmits the PHY_CCA.INDICATION (STATUS=BUSY) primitive to the MAC layer. Thus, the MAC layer determines that the carrier is occupied.

If the PLCP HEADER of the PLCP PDU frame is demodulated normally, the PHY PLCP layer transmits the PHY_RXSTART.INDICATION(RXVECTOR) primitive to the MAC layer. The MAC layer awaits data reception, recognizing that the data reception will start soon.

As the PSDU of the PLCP PDU frame is demodulated, the PHY PLCP layer transmits the PSDU to the MAC layer by the PHY_DATA.INDICATION primitive. If the channel state changes during the PSDU demodulation, or the PSDU demodulation is not normally performed due to errors, the PHY PLCP layer transmits a PHY_RXEND.INDICATION (RXERROR=CARRIERLOST) primitive to the MAC layer.

The PHY_RXEND.INDICATION (RXERROR=CARRIERLOST) primitive indicates abnormal frame reception caused by errors.

When the PLCP PDU frame ends, the PHY PLCP layer transmits the PHY_CCA.INDICATION(STATUS=IDLE) primitive to the MAC layer. Thus, the MAC layer recognizes that the carrier is not in use.

As described above with reference to FIGS. 6 and 7, the MAC layer recognizes that the carrier is not in use from the received PHY_CCA.INDICATION(STATUS=IDLE) primitive. As far as the PHY layer can receive the PLCP HEADER of the PLCP PDU frame normally, it can identify that the carrier is not in use at the time when the PLCP PDU frame ends irrespective of normal or erroneous reception of actual data.

Meanwhile, the terminal, in the presence of a frame to be transmitted, determines if the carrier (i.e. channel) is in use. Only when the carrier is in an idle state, the terminal transmits the frame. The operations of terminals in the IEEE 802.11a WLAN communication system will be described with reference to FIG. 8.

Figure 8:
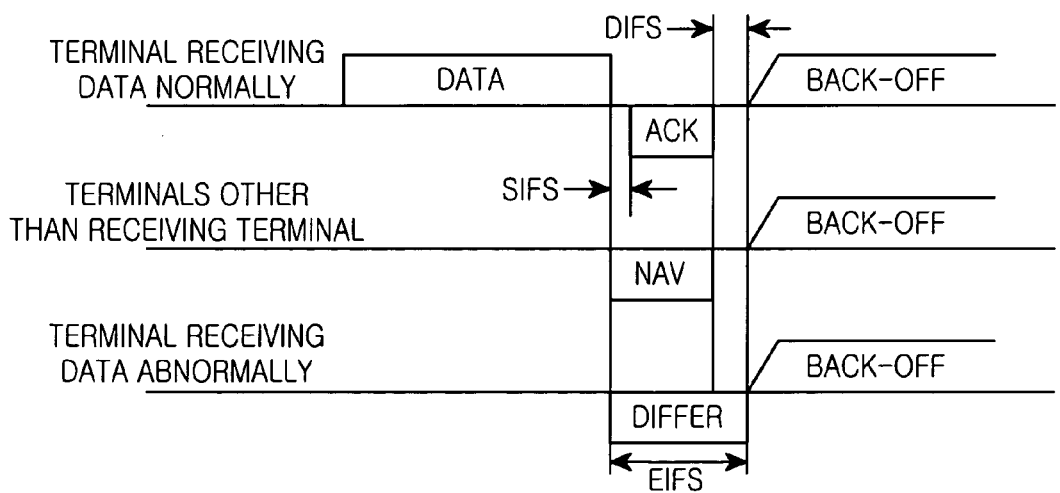
FIG. 8 is a diagram illustrating transmission and reception of terminals in the IEEE 802.11a WLAN communication system.

FIG. 8 is a diagram illustrating the transmission and the reception processes of the terminals in the IEEE 802.11a WLAN communication system.

Referring to FIG. 8, if receiving data normally from a transmitting terminal, a receiving terminal transmits an ACK to the transmitting terminal at a predetermined SIFS (Short Inter-Frame Space) after the data reception is completed. In a random backoff manner, the receiving terminal and other terminals attempt data transmission at a predetermined DIFS (DDCF (Distributed Coordination Function) Inter-Frame Space) after the ACK is completely transmitted. Consequently, the receiving terminal and other terminals attempt data transmission by a random backoff at a point in time spaced from the time the frame reception ends by a predetermined NAV (Network Allocation Vector) and the DIFS.

On the other hand, a receiving terminal, which erroneously has received data from the transmitting terminal, attempts data transmission by a random backoff at a predetermined EIFS (Extended Inter-Frame Space) after the data reception is completed. The EIFS is defined as the sum of the DIFS, SIFS, and the transmission duration of the ACK so as to avoid collision, which may occur due to the erroneous data reception.

The transmissions to and from terminals in the IEEE 892.11a WLAN communication system have been described above in connection with FIG. 8. Now the transmit power of a PLCP PDU frame in the IEEE 892.11a WLAN communication system according to an embodiment of the present invention will be described with reference to FIG. 9.

Figure 9:
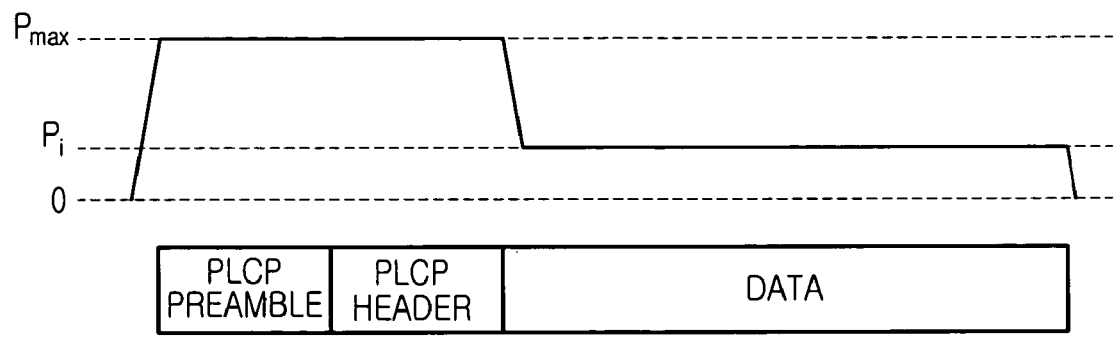
FIG. 9 is a diagram illustrating the transmission power of a PLCP PDU frame according to an embodiment of the present invention in the IEEE 802.11a WLAN communication system.

FIG. 9 is a diagram illustrating the transmission power of a PLCP PDU frame according to an embodiment of the present invention in the IEEE 802.11a WLAN communication system.

As stated before, once the PHY layer accurately demodulates the PLCP HEADER filed of the PLCP PDU frame, the PHY layer can notify the MAC layer that the carrier is not in use when the PLCP PDU frame ends. In other words, if the PHY layer can demodulate the PLCP HEADER accurately, the MAC layer can accurately determine the use state of the carrier in the WLAN communication system.

If terminals transmit signals at maximum power levels, each of the terminals can hear the other terminals, that is, no hidden terminals exist. However, a transmission power control based on power reduction leads to the appearance of hidden terminals and thus collisions may occur.

Accordingly, in the present invention, a terminal transmits a PLCP PDU frame at different power levels: PLCP PREAMBLE and PLCP HEADER at a maximum transmission power level, and DATA at a transmission power level great enough to allow DATA to reach a predetermined receiving terminal. Thus, power consumption in the terminal is minimized.

Referring to FIG. 9, the terminal transmits the PLCP PREAMBLE and the PLCP HEADER of a PLCP PDU frame at its maximum power level $P_{MAX}$, and transmits the DATA of the PLCP PDU frame at a transmit power level $P_I$, a level great enough to reach a receiving terminal. Therefore, all the other terminals within a BSS to which the transmitting terminal belongs can hear the PLCP PREAMBLE and PLCP HEADER and do not attempt to transmit a PLCP PDU frame, thereby avoiding collision.

The transmission power of a PLCP PDU frame in the IEEE 802.11a WLAN communication system according to the embodiment of the present invention has been described above with reference to FIG. 9. A transmission power control according to the embodiment of the present invention and an RTS/CTS-based transmission power control will be compared with reference to FIGS. 10A, 10B and 10C.

Figure 10A:
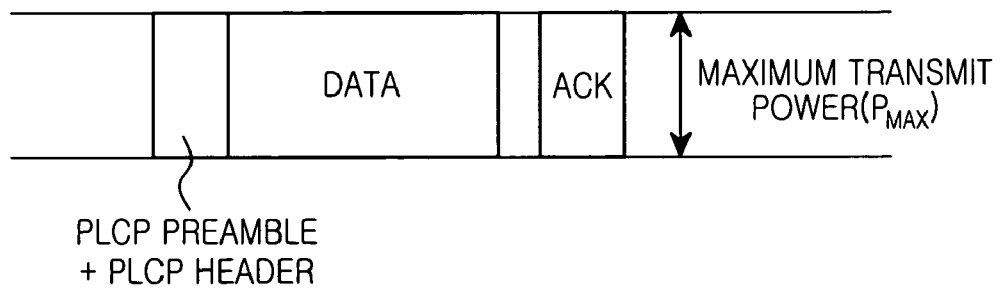
FIG. 10A is a diagram illustrating the transmission power of a PLCP PDU frame without a power control in the IEEE 802.11a WLAN communication system.

FIG. 10A is a diagram illustrating the transmission power of a PLCP PDU frame without a power control in the IEEE 802.11a WLAN communication system.

Referring to FIG. 10A, when a power control is not performed, a terminal transmits the PLCP PREAMBLE, the PLCP HEADER, and the DATA of a PLCP PDU frame at $P_{MAX}$. The terminal also transmits an ACK for a received PLCP PDU frame at $P_{MAX}$. Consequently, while the PLCP PDU frame can be transmitted without additional signal transmission and reception and time delay, power consumption is considerable.

Figure 10B:
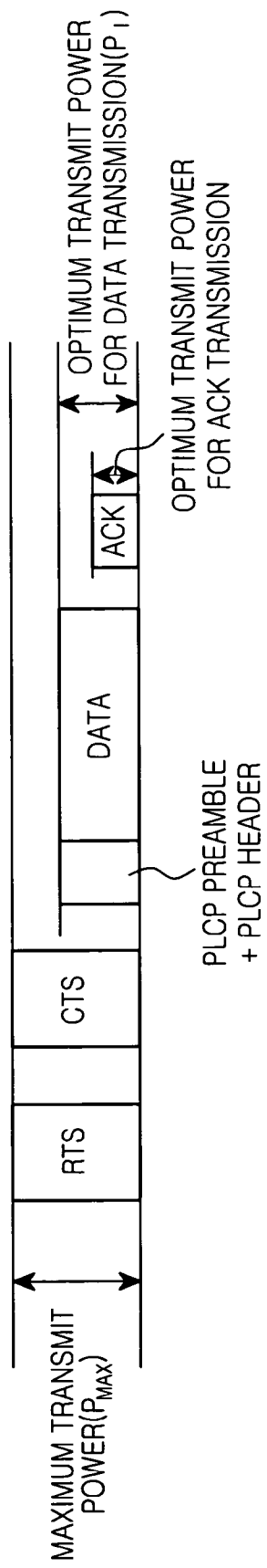
FIG. 10B is a diagram illustrating the transmission power of a PLCP PDU frame when an RTS/CTS-based transmit power control is performed in the IEEE 802.11a WLAN communication system.

FIG. 10B is a diagram illustrating the transmission power of a PLCP PDU frame when the RTS/CTS-based transmission power control is performed in the IEEE 802.11a WLAN communication system.

Referring to FIG. 10B, when the transmission power of a terminal is controlled based on RTS/CTS, the terminal transmits an RTS frame to an AP at $P_{MAX}$ before a PLCP PDU frame. Also, the AP transmits a CTS frame at $P_{MAX}$ to the terminal in response to the RTS frame. Then the terminal transmits the PLCP PDU frame at the optimum transmission power $P_I$ to allow the PLCP PDU frame to reach a corresponding AP. The AP also transmits an ACK for the PLCP PDU frame at an optimum power level to the terminal. The optimum power level for the ACK is less than $P_I$.

Thus, the RTS/CTS-based transmission power control mechanism allows for the transmission of a PLCP PDU frame after a time delay involved in transmission and reception of an RTS frame and a CTS frame. Furthermore, the transmission of the RTS and CTS frames increases power consumption.

Figure 10C:
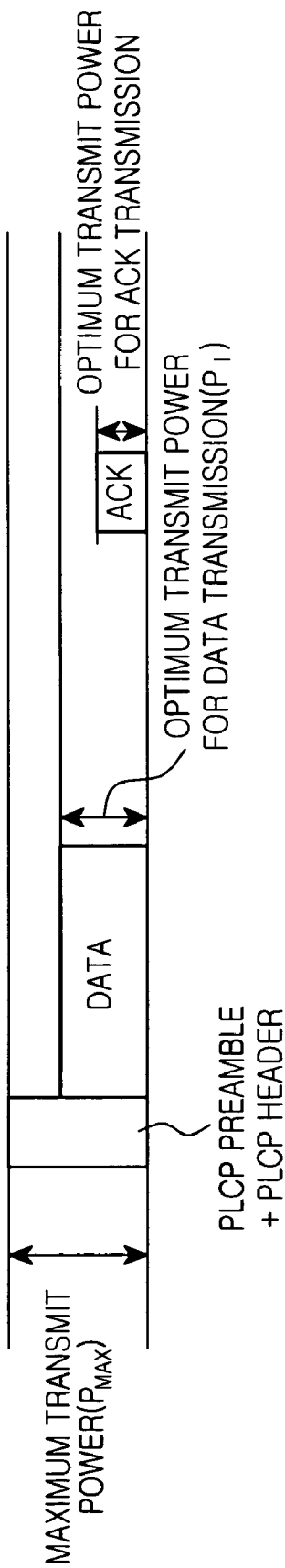
FIG. 10C is a diagram illustrating the transmission power of a PLCP PDU frame when a transmission power control is performed according to the embodiment of the present invention in the IEEE 802.11a WLAN communication system.

Finally, FIG. 10C is a diagram illustrating the transmission power of a PLCP PDU frame when a transmission power control is performed according to the embodiment of the present invention in the IEEE 802.11a WLAN communication system.

Referring to FIG. 10C, when the transmission power of a terminal is controlled according to the embodiment of the present invention, the terminal transmits the PLCP PREAMBLE and the PLCP HEADER of a PLCP PDU frame at $P_{MAX}$, and the DATA of the PLCP PDU frame at the optimum power level $P_I$, a level great enough to reach a receiving terminal. Also, the terminal transmits to a receiving terminal an ACK for a received PLCP PDU frame at an optimum transmit power level. The optimum transmit power for the ACK is less than $P_I$.

Thus, the inventive transmission power control allows for the transmission of a PLCP PDU frame at a minimum transmission power level without additional signal transmission, reception and time delay. As a result, the total system throughput is increased and power consumption in the terminal is minimized.

Figure 11:
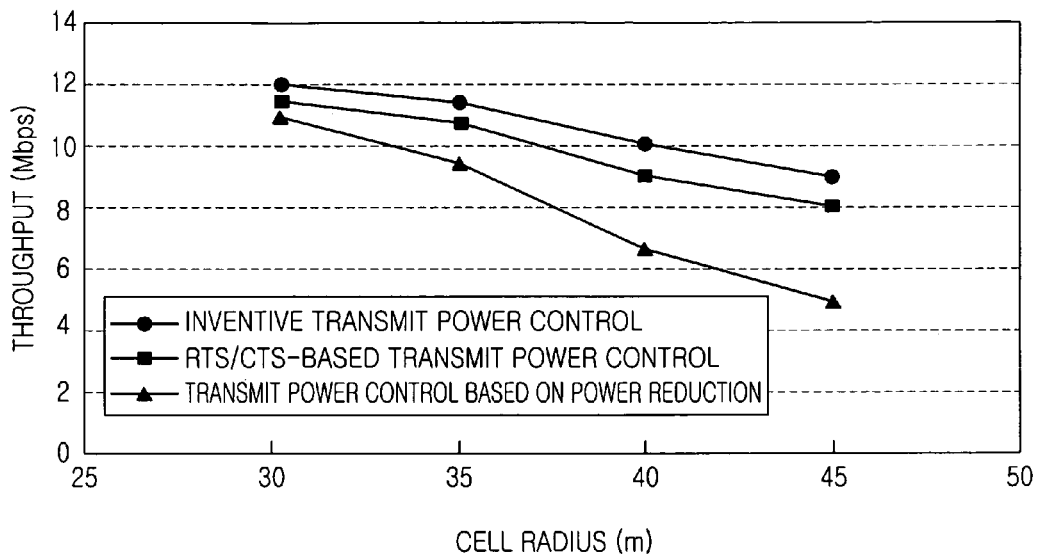
FIG. 11 is a graph comparing in terms of system throughput a transmission power control based on power reduction, the RTS/CTS-based transmission power control, and the transmission power control according to the embodiment of the present invention in the IEEE 802.11a WLAN communication system.

The transmission power control according to the embodiment of the present invention has been compared with the RTS/CTS-based transmission power control with reference to FIGS. 10A, 10B and 10C. With reference to FIG. 11, a power reduction-based transmission power control, the RTS/CTS-based transmission power control, and the transmission power control according to the embodiment of the present invention will be compared in terms of system throughput in the WLAN communication system.

FIG. 11 is a graph comparing in terms of system throughput the transmission power control based on power reduction, the RTS/CTS-based transmission power control, and the transmission power control according to the embodiment of the present invention in the IEEE 802.11a WLAN communication system.

Referring to FIG. 11, the vertical axis denotes the system throughput in Mega bits per second (Mbps), and the horizontal axis denotes a cell radius in meters. The system throughput is greater in the transmission power control according to the embodiment of the present invention, than in the RTS/CTS-based transmission power control, or in the power reduction-based transmission power control.

Figure 12:
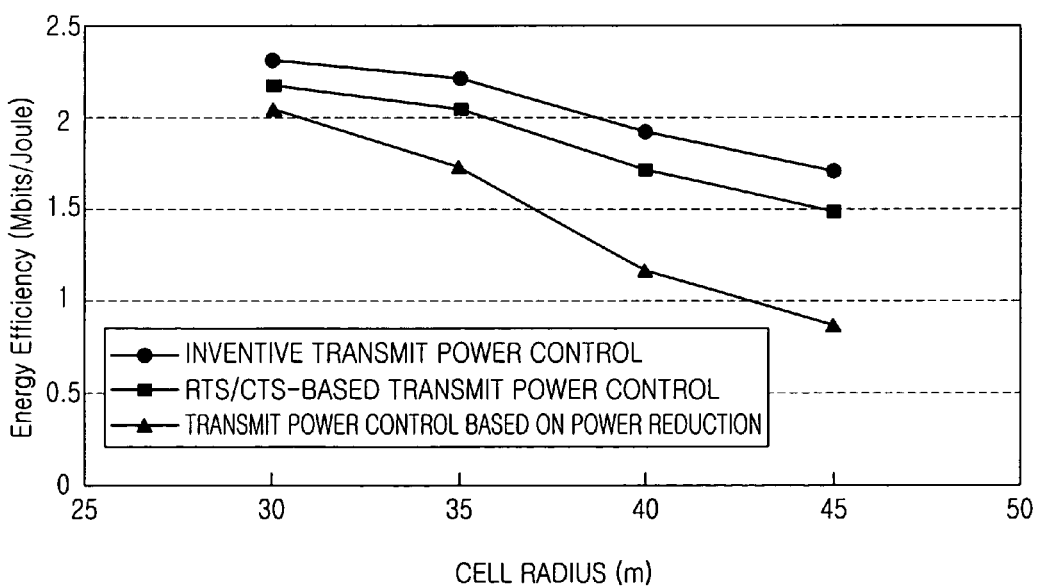
FIG. 12 is a graph comparing in terms of energy efficiency the transmission power control based on power reduction, the RTS/CTS-based transmission power control, and the transmission power control according to the embodiment of the present invention in the IEEE 802.11a WLAN communication system.

With reference to FIG. 12, the power reduction-based transmission power control, the RTS/CTS-based transmission power control, and the transmission power control according to the embodiment of the present invention will be compared in terms of energy efficiency in the WLAN communication system.

FIG. 12 is a graph comparing in terms of energy efficiency the transmission power control based on power reduction, the RTS/CTS-based transmission power control, and the transmission power control according to the embodiment of the present invention in the IEEE 802.11a WLAN communication system.

Referring to FIG. 12, a vertical axis denotes energy efficiency in mega bits per joule [Mbit/Joule] and the horizontal axis denotes a cell radius in meters [m]. The energy efficiency is greater in the transmission power control according to the embodiment of the present invention, than in the RTS/CTS-based transmission power control, or in the power reduction-based transmission power control.

As described above, the present invention advantageously maximizes system throughput by preventing the appearance of hidden terminals that might otherwise be caused by a transmission power control, while minimizing power consumption in a terminal in a WLAN communication system. That is, without additional frame transmission or reception, the transmit power of the terminal can be controlled. Thus, the power consumption of the terminal is minimized and the hidden terminal problem encountered with a transmit power control is eliminated, preventing collision for a carrier.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of controlling transmission power of a transmitting terminal among a plurality of terminals for transmitting/receiving frames in a wireless communication system, the frames having a frame structure, the frame structure including a header field including transmission rate information and length information of data transmitted in a frame and including a data field containing the data, the method comprising:

determining, at a physical (PHY) layer of the transmitting terminal, whether a resource is in use while preparing a frame for transmission based on the rate information and the length information of a header field received from one of the plurality of terminals;

in response to determining the resource is in use, transmitting a busy message from the PHY layer to a Media Access Control (MAC) layer of the transmitting terminal, and in response to determining the resources is not in use, transmitting an idle message from the PHY layer to the MAC layer of the transmitting terminal;

upon receiving the idle message, transmitting a header field including the rate information and the length information of the frame for transmission at a maximum transmission power level available to the transmitting terminal, when it is determined that the resource is not in use; and transmitting the data field of the frame for transmission at an optimum transmission power level, which is less than the maximum transmission power level of the transmitting terminal, to allow a receiving terminal to receive the transmitted data field.

2. The method of claim 1, wherein the determining of whether the resource is in use comprises determining whether one of the plurality of terminals other than the transmitting terminal within the wireless communication system is transmitting data at a time it is determined that the frame for transmission is to be transmitted.

3. The method of claim 2, wherein the determining of whether the one of the plurality of terminals is transmitting data comprises:

detecting the transmission rate information and the length information from the received header field, the received header field being received at or before the time it is determined that the frame for transmission is to be transmitted from the transmitting terminal;

determining a transmission duration of the data field corresponding to the received header field using the transmission rate and the length information of the received header field; and determining that the one of the plurality of terminals is transmitting data when the time it is determined that the frame for transmission is to be transmitted is within the transmission duration of the data field corresponding to the received header field, and determining that the second terminal is not transmitting data when the time it is determined that the frame for transmission is to be transmitted is not within the transmission duration of the data field corresponding to the received header field.

4. The method of claim 1, wherein the resource is a carrier on which the data is transmitted/received.

5. The method of claim 1 wherein the rate information and the length information are used for determining a transmission duration of data by the receiving terminal.

6. A method of controlling a transmission power of a transmitting terminal among a plurality of terminals for transmitting/receiving frames in a wireless communication system, the frames having a Physical Layer Convergence Protocol (PLCP) Protocol Data Unit (PDU) frame structure, the PLCP PDU frame structure including a PLCP preamble field indicating a start of a PLCP PDU frame, a PLCP header field including transmission rate information and length information of data transmitted in the PLCP PDU frame and a data field including the data, the method comprising:

determining, at a PHY layer of the transmitting terminal, whether a resource is in use based on the rate information and the length information of a PLCP header field received from one of the plurality of terminals when PLCP PDU frame for transmission is to be transmitted;

in response to determining the resource is in use, transmitting a busy message from the PHY layer to a MAC layer of the transmitting terminal, and in response to determining the resources is not in use, transmitting an idle message from the PHY layer to the MAC layer of the transmitting terminal;

upon receiving the idle message, transmitting the PLCP preamble and header fields including the rate information and the length information of the PLCP PDU frame for transmission at a maximum transmission power level available to the transmitting terminal, when it is determined that the resource is not in use; and transmitting the data field of the PLCP PDU frame for transmission at an optimum transmit power level, which is less than the maximum transmission power level, to allow a receiving terminal to receive the transmitted data field.

7. The method of claim 6, wherein the determining of whether the resource is in use comprises determining whether one of the plurality of terminals other than the transmitting terminal within the wireless communication system is transmitting data at a time it is determined that the PLCP PDU frame for transmission is to be transmitted.

8. The method of claim 7, wherein the determining of whether one of the plurality of terminals is transmitting data comprises:

detecting the transmission rate information and the length information from the received PLCP header field, the received PLCP header field being received at or before the time it is determined that the PLCP PDU frame for transmission is to be transmitted from the transmitting terminal;

determining a transmission duration of data included in a PLCP PDU frame corresponding to the received PLCP header field using the transmission rate and the length information of the received header field; and determining that the one of the plurality of terminals is transmitting data if the time it is determined that the PLCP PDU frame for transmission is to be transmitted is within the transmission duration of the data in the PLCP PDU frame corresponding to the received PLCP header field, and determining that the second terminal is not transmitting data if the time it is determined that the PLCP PDU frame for transmission is to be transmitted is not within the transmission duration of the data in the PLCP PDU frame corresponding to the received PLCP header field.

9. The method of claim 6, wherein the resource is a carrier on which the data is transmitted/received.

10. The method of claim 6 wherein the rate information and the length information are used for determining a transmission duration of data by the receiving terminal.

11. A system for controlling a transmission power of frames transmitted/received among a plurality of terminals in a wireless communication system, the frames having a frame structure, the frame structure including a header field including transmission rate information and length information of data transmitted associated with the frame structure and a data field including the data, the system comprising:

a receiving terminal; and a transmitting terminal for determining whether a resource is in use at a time when a frame is to be transmitted, in response to determining the resource is in use, transmitting a busy message from the PHY layer to a MAC layer of the transmitting terminal and in response to determining the resources is not in use, transmitting an idle message from the PHY layer to the MAC layer of the transmitting terminal, upon receiving the idle message, transmitting the header field of a frame for transmission to the receiving terminal at a maximum transmission power level available to the transmitting terminal to provide an indication to the plurality of terminals other than the transmitting terminal and the receiving terminal within the wireless communication system that a resource is in use, and transmitting the data field of the frame for transmission at an optimum transmit power level, which is less than the maximum transmission power level, to allow the receiving terminal to receive the transmitted data field, wherein the receiving terminal receives the frame for transmission, determines a transmission duration of data transmission of the frame for transmission using the transmission rate information and the length information included in the header field of the frame for transmission, and avoids transmission of another frame during the determined transmission duration.

12. The system of claim 11, wherein the resource is a carrier on which the data is transmitted/received.

13. A system for controlling a transmission power of frames transmitted/received among terminals in a wireless communication system, the frames having a Physical Layer Convergence Protocol (PLCP) Protocol Data Unit (PDU) frame structure, the PLCP PDU frame structure including a PLCP preamble field indicating a start of a PLCP PDU frame, a PLCP header field containing transmission rate information and length information of data transmitted in the PLCP PDU frame and a data field having the data, the system comprising:

a receiving terminal;
a transmitting terminal for
determining whether a resource is in use at a time when a PLCP PDU frame is to be transmitted,
in response to determining the resource is in use, transmitting a busy message from the PHY layer to a MAC layer of the transmitting terminal and in response to determining the resources is not in use, transmitting an idle message from the PHY layer to the MAC layer of the transmitting terminal,
upon receiving the idle message, transmitting the PLCP PDU frame when it is determined that the resource is not in use including transmitting the PLCP preamble and header fields of the PLCP PDU frame to the receiving terminal at a maximum transmission power level available to the transmitting terminal, and
transmitting the data field of the PLCP PDU frame at an optimum transmit power level, which is less than the maximum transmission power level, to allow the receiving terminal to receive the transmitted data field,
wherein the receiving terminal receives the transmitted header field of the transmitted PLCP PDU frame, determines a transmission duration of data of the transmitted PLCP PDU frame using the transmission rate and the length information included in the PLCP header field of the transmitted PLCP frame, and avoids transmission of another frame during the determined transmission duration.

14. The system of claim 13, wherein the resource is a carrier on which the data is transmitted/received.

15. A method of controlling a transmission power of a transmitting terminal among terminals for transmitting/receiving frames in a wireless communication system, the frames having a frame structure, the frame structure including a header field including transmission rate information and length information of data transmitted in a frame, and including a data field including the data, the method comprising:

in response to determining that a resource is in use, transmitting a busy message from a PHY layer of the transmitting terminal to a MAC layer of the transmitting terminal, and in response to determining the resources is not in use, transmitting an idle message from the PHY layer to the MAC layer;

in response to receiving the idle message, transmitting the header field of a frame for transmission including the rate information and the length information to a receiving terminal at a maximum transmission power level available to the transmitting terminal to provide an indication to terminals within the wireless communication system other than the transmitting terminal and the receiving terminal that a resource is in use based on the transmitted header field; and transmitting the data field of the frame for transmission at an optimum transmission power level, which is less than the maximum transmission power level, to allow the receiving terminal to receive the transmitted data field.

16. The method of claim 15 wherein the rate information and the length information are used for determining a transmission duration of data by the receiving terminal.

17. A method of controlling a transmission power of a transmitting terminal among terminals for transmitting/receiving frames in a wireless communication system, the frames having a Physical Layer Convergence Protocol (PLCP) Protocol Data Unit (PDU) frame structure, the PLCP PDU frame structure including a PLCP preamble field indicating a start of a PLCP PDU frame, a PLCP header field including transmission rate information and length information of data transmitted in the PLCP PDU frame and a data field including the data, the method comprising:

in response to determining that a resource is in use, transmitting a busy message from a PHY layer of the transmitting terminal to a MAC layer of the transmitting terminal, and in response to determining the resources is not in use, transmitting an idle message from the PHY layer to the MAC layer;

in response to receiving the idle message, transmitting the PLCP preamble and header fields of a PLCP PDU frame for transmission including the rate information and the length information to a receiving terminal at a maximum transmission power level available to the transmitting terminal to provide an indication to terminals other than the transmitting terminal and the receiving terminal within the wireless communication system that a resource is in use based on the transmitted header field; and transmitting the data field of the PLCP PDU frame for transmission at an optimum, transmit power level, which is less than the maximum transmission power level, to allow the receiving terminal to receive the transmitted data field.

18. The method of claim 17 wherein the rate information and the length information are used for determining a transmission duration of data by the receiving terminal.

* * * * *